Aug. 21, 1962
R. EMEIS
3,050,667
METHOD FOR PRODUCING AN ELECTRIC SEMICONDUCTOR DEVICE OF SILICON
Filed Dec. 28, 1960
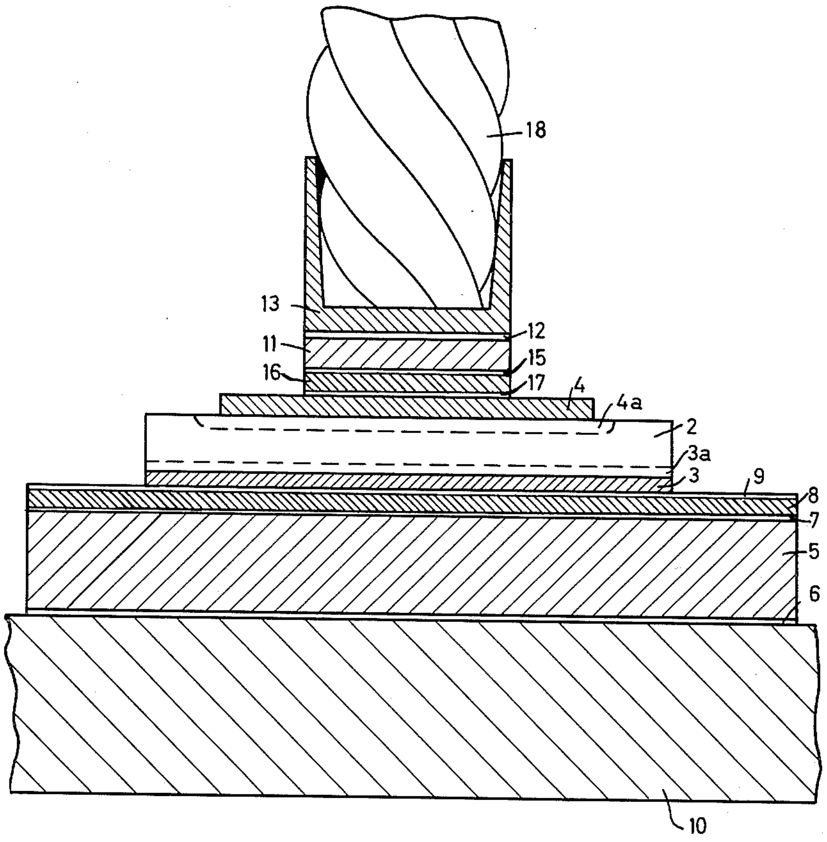

United States Patent Office 3,050,667 Patented Aug. 21, 1962

3,050,667

METHOD FOR PRODUCING AN ELECTRIC SEMICONDUCTOR DEVICE OF SILICON

Reimer Emeis, Ebermannstadt, Germany, assignor to Siemens-Schuckertwerke Aktiengesellschaft, Berlin-Siemensstadt and Erlangen, Germany, a corporation of Germany Filed Dec. 28, 1960, Ser. No. 78,903
Claims priority, application Germany Dec. 30, 1959
9 Claims. (Cl. 317—240)

My invention relates to a method for producing an electric semiconductor device of the type having a disc or wafer of silicon joined on both sides with gold-alloy electrodes that contain donor substance and acceptor substance respectively, one of the electrodes being bonded face-to-face with a carrier plate of molybdenum. The invention also relates to the product of the method.

According to a prior method the carrier plate is gold-coated, and the gilded side of the plate is alloyed together with the adjacent gold electrode of the silicon disc at an alloying temperature of about 400 to 500° C. Prior to such alloying operation, the gold coating is bonded to the carrier plate by "firing" at a temperature up to approximately 900° C. When, thereafter the gilded molybdenum plate and the gold-containing electrode of the semiconductor device are being alloyed together, the gold coating of the molybdenum plate becomes integrated into the gold-silicon alloy so that the alloy directly touches the molybdenum substance of the carrier plate. Some of the silicon contained in the alloy can then form a compound with the surface region of the molybdenum plate. Such formation is promoted by the fact that the preferred alloying temperature is kept slightly above the eutectic melting temperature and that the alloying operation is preferably performed in vacuum and the assembly is permitted to cool slowly after termination of the alloying operation. The occurrence of the molybdenum-silicon compound may impair the adhesion of the gold coating to the molybdenum carrier plate and in some cases may virtually prevent such adhesion, thus resulting in a considerable number of rejects.

It is an object of my invention to reliably eliminate such deficiencies.

To this end, according to my invention, a silver layer is interposed between the molybdenum carrier plate and its gold coating.

The melting temperature of the silver-silicon eutectic is considerably higher than the temperature employed when the prepared molybdenum carrier plate and the gold electrode of the silicon disc are being alloyed together. For that reason, the silicon of the liquid gold-silicon eutectic cannot, during alloying operation, penetrate through the silver layer and reach the surface of the molybdenum plate. As a result, the formation of the above-mentioned molybdenum-silicon compound is prevented.

Shown on the drawing, by way of example, is an embodiment of a rectifier produced by the method according to the present invention.

Alloyed into an n-type silicon disc wafer or plate 2, on the bottom thereof, is a boron-containing gold foil 3. Due to the alloying operation, there is formed a boron-containing gold-silicon alloy layer 3 and also a p-type electrode region 3*a* adjacent to the layer 3. The p-type region 3*a* is doped with boron and consists of silicon that during cooling recrystallized out of the alloy. The alloying temperature used for this purpose is about 700 to 800° C. During the same operation, the top surface of the silicon disc 2 is provided by alloying with a disc-shaped gold foil which contains antimony. Due to this alloying operation there is produced an antimony-containing gold-silicon alloy layer 4 and a highly doped n-type region 4*a* in the silicon semiconductor.

Separate from, and independently of, the above-described steps of manufacturing operation, a molybdenum carrier plate 5 approximately 3 mm. thick and containing on its bottom side a Fernico layer 6 of approximately 10 micron thickness (Fernico is an iron-nickel-cobalt alloy obtainable in the trade under this name), is plated on its top side with a gold coating 7 preferably galvanically, i.e. by electrolytic deposition. The gold coating 7 may have a thickness of approximately 5 microns and can be separately "fired" into the molybdenum plate by heating the plate up to a temperature of approximately 900° C.

After the gold coating is prepared, a silver coating is galvanically deposited thereupon and is separately "fired" at about 500° C. The thickness of the silver coating is preferably at least 10 microns. Instead of the galvanically deposited silver coating, a silver foil of 50 to 200 microns thickness can be hard-soldered to the gold coating.

After the silver coating is applied, another gold coating 9 is galvanically deposited and fired at about 500° C. The thickness of the second gold coating 9 should not exceed one-tenth of the thickness of the gold foil used for alloying the silicon disc and is preferably less than one-fiftieth of the thickness of the latter foil.

The gold coating 9 of the molybdenum carrier plate 5 thus prepared is subsequently alloyed together with the gold alloy layer 3 of the silicon disc 2 at a temperature of about 400 to 500° C. In the same alloying operation, the gold-silicon alloy layer 4 on the flat top side of the silicon disc is alloyed together with another molybdenum plate 11 previously prepared in the same manner as described above with respect to the carrier plate 5. That is, the plate 11 is previously provided with a gold layer 15 upon which a silver layer 16 and another gold layer 17 are deposited. The upper flat side of the molybdenum plate 11 is soldered together, by means of a Fernico layer 12, with a copper cup 13 into which the end of a flexible cable 18 is pressed. The Fernico-plating 6 of the molybdenum carrier plate 5 is soldered together with the housing 10.

Instead of the first gold coating 7 or 15, the molybdenum plates may also be coated galvanically with copper or nickel. The copper or nickel coatings are bonded to the molybdenum carrier plate by firing at about 900° C.

Aside from the provision of the above-mentioned layers of silver between the molybdenum plates and the gold coating of these plates, the method corresponds to, or can be carried out in accordance with, those described in my Patent 2,960,419 issued November 15, 1960, and in my copending applications Serial No. 790,877, filed February 3, 1959; Serial No. 842,775, filed September 28, 1959; and Serial No. 1,846, filed January 12, 1960; all assigned to the assignee of the present invention.

I claim:

1. The method of producing an electric semiconductor device having a semiconductor silicon plate with a gold-containing surface electrode and having a gold-coated molybdenum plate alloy-bonded with said surface electrode, which comprises the steps of separately coating the molybdenum plate with silver, then coating the silver with gold, and thereafter heating the molybdenum plate with its gilded side in face-to-face contact with the gold-containing surface electrode of the silicon plate to a temperature of about 400 to 500° C. to thereby join the molybdenum plate and the silicon plate by alloying.

2. The method of producing an electric semiconductor device having a semiconductor silicon plate with a gold electrode attached thereon and having a gold-coated molybdenum plate alloy-bonded with said surface electrode, which comprises the steps of electroplating one side of the molybdenum plate with silver, then coating the silver with gold, and thereafter heating the molybdenum plate with its gilded side in face-to-face contact with the gold electrode of the silicon plate to a temperature of about 400 to 500° C. to join the molybdenum plate and the silicon plate by alloy bonding.

3. The method of producing an electric semiconductor device having a semiconductor silicon plate with a gold surface electrode and a gold-coated molybdenum plate alloy-bonded with said surface electrode, which comprises the steps of soldering a silver foil to said plate in face-to-face contact therewith, then coating the silver with gold, and thereafter heating the molybdenum plate with its gilded side in face-to-face contact with the gold electrode of the silicon plate to a temperature of about 400 to 500° C. to alloy-bond the molybdenum plate and the silicon plate.

4. The method of producing an electric semiconductor device having a silicon plate with a gold-containing surface electrode and a gold-coated molybdenum plate alloy-bonded with said surface electrode, which comprises the steps of coating the molybdenum plate on one side with metal selected from the group consisting of gold, nickel and copper, coating the so coated side of the molybdenum plate with silver, then coating the silver with gold, and thereafter heating the molybdenum plate with its gilded side in face-to-face contact with the gold electrode of the silicon plate to a temperature of about 400 to 500° C. to alloy-bond the molybdenum plate and the silicon plate.

5. The method of producing an electric semiconductor device having a silicon plate with a gold-containing surface electrode and a gold-coated molybdenum plate alloy-bonded with said surface electrode, which comprises the steps of separately producing said electrode on said silicon plate by alloying a gold foil together with said silicon plate, separately coating the molybdenum plate with silver, then depositing upon the silver a coating of gold having a thickness less than one-tenth the thickness of said gold foil, and thereafter heating the molybdenum plate with its gilded side in face-to-face contact with the gold electrode of the silicon plate to a temperature of about 400 to 500° C. to alloy-bond the molybdenum plate and the silicon plate.

6. An electric semiconductor device comprising a silicon plate having an alloy-bonded surface electrode of gold, a carrier plate of molybdenum adjacent to the electrode in face-to-face relation thereto, a silver layer on said molybdenum plate, and a gold coating between the silver layer and the gold electrode of the silicon plate, said gold coating and gold electrode being alloy-bonded to, and merging with, each other.

7. An electric semiconductor device comprising a silicon plate having two gold electrodes alloy-bonded to the silicon on the two sides of said plate and containing donor and acceptor substance respectively, two molybdenum plates adjacent to said respective electrodes in face-to-face relation thereto, each molybdenum plate having a silver layer, and each having a gold coating between the silver layer and the respective gold electrode of the silicon plate, said gold coatings and respective gold electrodes being alloy-bonded to, and merging with, each other.

8. An electric semiconductor device comprising a semiconductor silicon plate having a gold electrode plate alloy-bonded to a face of the silicon plate, a molybdenum plate adjacent to the gold electrode in face-to-face relation therewith, the molybdenum plate having a coating taken from the group consisting of gold, copper, and nickel, an intermediate silver layer on said coating, an outer gold layer on said silver layer, said outer gold layer being alloy-bonded to the gold electrode plate of the silicon plate.

9. The device defined in claim 8, the first-mentioned coating of the molybdenum plate being gold, the outer gold layer on the silver layer being not more than one-tenth the thickness of the gold electrode alloy-bonded to the silicon plate.

References Cited in the file of this patent

UNITED STATES PATENTS

| | | |
|---|---|---|
| 2,922,092 | Gazzara et al. | Jan. 19, 1960 |
| 2,964,830 | Henkels et al. | Dec. 20, 1960 |
| 2,965,519 | Christensen | Dec. 20, 1960 |
| 2,973,466 | Atalla et al. | Feb. 28, 1961 |